US009933065B2

(12) United States Patent
Makita et al.

(10) Patent No.: US 9,933,065 B2
(45) Date of Patent: Apr. 3, 2018

(54) VEHICULAR GEAR TRANSMISSION STRUCTURE

(71) Applicant: HONDA MOTOR CO., LTD., Tokyo (JP)

(72) Inventors: Hiroyuki Makita, Wako (JP); Yasushi Fujimoto, Wako (JP); Taku Hirayama, Wako (JP); Hirokazu Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/447,306

(22) Filed: Mar. 2, 2017

(65) Prior Publication Data

US 2017/0268654 A1    Sep. 21, 2017

(30) Foreign Application Priority Data

Mar. 18, 2016    (JP) ................................. 2016-055938

(51) Int. Cl.
| | |
|---|---|
| *F16H 57/00* | (2012.01) |
| *F16H 3/08* | (2006.01) |
| *F16H 55/14* | (2006.01) |
| *F16H 63/30* | (2006.01) |
| *F16H 57/02* | (2012.01) |

(52) U.S. Cl.
CPC ........... *F16H 57/0006* (2013.01); *F16H 3/08* (2013.01); *F16H 55/14* (2013.01); *F16H 57/00* (2013.01); *F16H 2057/02065* (2013.01); *F16H 2063/3079* (2013.01)

(58) Field of Classification Search
CPC ................. F16H 57/0006; F16H 2003/0807
See application file for complete search history.

(56) References Cited

U.S. PATENT DOCUMENTS

| 4,448,094 | A | * | 5/1984 | Yarnell | ................. | B60W 30/18 |
|---|---|---|---|---|---|---|
| | | | | | | 477/107 |
| 4,543,846 | A | * | 10/1985 | Inui | ......................... | F16H 63/20 |
| | | | | | | 74/473.24 |
| 6,370,977 | B1 | * | 4/2002 | Kubo | .................. | F16H 57/0006 |
| | | | | | | 74/339 |
| 2007/0068322 | A1 | * | 3/2007 | Yamamoto | ............... | F16H 63/20 |
| | | | | | | 74/519 |
| 2011/0190990 | A1 | * | 8/2011 | Nedachi | ................ | F16D 48/064 |
| | | | | | | 701/51 |
| 2014/0083228 | A1 | * | 3/2014 | Mitsubori | ............... | F16H 63/18 |
| | | | | | | 74/473.36 |
| 2015/0090062 | A1 | * | 4/2015 | Norita | ..................... | F16H 63/18 |
| | | | | | | 74/473.37 |
| 2017/0268654 | A1 | * | 9/2017 | Makita | ....................... | F16H 3/08 |
| 2017/0268671 | A1 | * | 9/2017 | Fujimoto | .............. | F16H 63/304 |

FOREIGN PATENT DOCUMENTS

JP    2003-148615    5/2003

\* cited by examiner

*Primary Examiner* — William Kelleher
*Assistant Examiner* — Gregory Prather
(74) *Attorney, Agent, or Firm* — Rankin, Hill & Clark LLP

(57) ABSTRACT

A shift fork shaft 123 has both end portions movably fitted in shaft supports 83e and 116a of a gear transmission 82. Clearances are left between bottom surfaces 83g and 116c of the shaft supports 83e and 116a and both end faces 123c of the shift fork shaft 123. Caps 145 are mounted in both axial ends of the shift fork shaft 123.

10 Claims, 5 Drawing Sheets

VEHICULAR GEAR TRANSMISSION STRUCTURE

INCORPORATION BY REFERENCE

The present application claims priority under 35 U.S.C. § 119 to Japanese Patent Application No. 2016-055938 filed on Mar. 18, 2016. The content of the application is incorporated herein by reference in its entirety.

TECHNICAL FIELD

The present invention relates to a vehicular gear transmission structure.

BACKGROUND ART

Heretofore, there has been known a gear shifting mechanism for transmissions which includes a shift drum angularly movable about its own axis by a gear shifting action and a plurality of shift forks supported on a shift fork shaft for sliding movement in response to angular movement of the shift drum (see, for example, Patent Document 1).

The shift fork shaft has its both ends supported in bosses 27a on a crankcase.

PRIOR ART DOCUMENT

Patent Document

[Patent Document 1] Japanese Patent Laid-Open No. 2003-148615

SUMMARY OF THE INVENTION

Problem to be Solved by the Invention

In the above gear shifting mechanism, when one of the shift forks is caused to slide by the shift drum, the shift fork may cause the shift fork shaft to slide in unison therewith depending on the way in which the shift fork and the shift fork shaft are tilted with respect to each other. Therefore, bottom surfaces of the bosses are formed to such a depth that the shift fork shaft is axially movable therein. When a quick gear shifting action is performed, the shift fork shaft slides forcefully in the bosses, causing one of ends of the shift fork shaft to move toward the bottom surface of the bosses in the corresponding boss.

As a consequence, hammering noise tends to be produced when the end of the shift fork shaft hits the bottom surface of the boss. One solution proposed by the above gear shifting mechanism is to construct one of the shift forks integrally with the shift fork shaft, thereby preventing the shift fork from being dragged by the other shift fork which is moved. The shift fork shaft is axially movable in the same range as the shift fork integral therewith, and hence stops short of hitting the bottom surfaces of the bosses.

However, the integral structure of the shift fork and the shift fork shaft is liable to make it difficult for the gear shifting mechanism to make smooth gear shifts because gears need to be shifted against not only the resistance from the movement of the shift fork itself but also the resistance from the sliding movement of the shift fork shaft.

It is therefore an object of the present invention to provide a vehicular gear transmission structure which is capable of preventing hammering noise from being produced by a shift fork shaft whose ends would otherwise hit the bottom surfaces of bosses and also of allowing a gear transmission to shift gears smoothly.

Means for Solving the Problem

In order to solve the problem described above, according to an aspect of the present invention, there is provided a vehicular gear transmission structure including a gear transmission (82) having a transmission shaft (125), a plurality of transmission gears axially movably mounted on the transmission shaft (125), and a gear shifting mechanism (170) having a shift drum (177) angularly movable in response to a gear shifting action, a shift fork shaft (123) supported by a transmission case (160) of the gear transmission (82), and a plurality of shift forks (124) axially movably supported on the shift fork shaft (123), whereby when the shift drum (177) is angularly moved about its own axis in response to a gear shifting action, a selected one of the shift forks (124) and a corresponding one of the transmission gears are axially moved to change gear positions. The shift fork shaft (123) has both end portions movably fitted individually in bosses (83e, 116a) of the gear transmission (82), with clearances left between bottom surfaces (83g, 116c) of the bosses (83e, 116a) and both end faces (123c, 123c) of the shift fork shaft (123), and dampers (145) are mounted in both axial ends of the shift fork shaft (123).

By the configuration described above, the dampers (145) may include elastic members and be of a trapezoidal cross-sectional shape tapered off toward tip end surfaces (145d) thereof which abut with the bottom surfaces (83g, 116c) of the bosses (83e, 116a).

Further, by the configuration described above, the dampers (145) may have axially extending holes (145c) defined therein which are open at tip end surfaces (145d) thereof toward the bottom surfaces (83g, 116c) of the bosses (83e, 116a).

Further, by the configuration described above, the axially extending holes (145c) may include through holes (145c) extending axially through the dampers (145).

Further, by the configuration described above, the dampers (145) may have respective ends, which are opposite tip end surfaces (145d) thereof which abut with the bottom surfaces (83g, 116c) of the bosses (83e, 116a), retained in place by fitting in the shift fork shaft (123) and held against an inner circumferential surface thereof.

Further, by the configuration described above, the dampers (145) may be of a tubular shape and have holes (145c) defined therein which extend therethrough in alignment with a central axis (145g) of the tubular shape.

Further, by the configuration described above, each of the dampers (145) may include a smaller-diameter portion (145a) fitted in the shift fork shaft (123) and held against an inner circumferential surface thereof, and a larger-diameter portion (145b) having a tip end surface (145d) facing one of the bottom surfaces (83g, 116c) of the bosses (83e, 116a), the larger-diameter portion (145b) having an integral positioner (145f) that is held in abutment against an end face (123c) of the shift fork shaft (123) for controlling the position where the damper (145) is fitted in the shift fork shaft (123).

Further, by the configuration described above, an axial length of the smaller-diameter portion (145a) may be larger than an axial length of the larger-diameter portion (145b).

Effects of the Invention

According to the present invention, both end portions of the shift fork shaft are movably fitted in the bosses of the gear transmission, the clearances are left between the bottom surfaces of the bosses and both end faces of the shift fork shaft, and the dampers are mounted in both axial ends of the shift fork shaft. Since the dampers are mounted in the axial ends of the shift fork shaft, it is possible to prevent hammering noise from being produced due to direct collision between the end faces of the shift fork shaft and the bottom surfaces of the bosses. When the shift forks are moved, they can be moved separately from the shift fork shaft. Therefore, though the shift forks themselves impose resistance at the time a gear shifting action is performed, no sliding resistance necessarily occurs between the shift fork shaft and the bosses, allowing the gear transmission to shift gears smoothly.

The dampers include elastic members and are of a trapezoidal cross-sectional shape tapered off toward the tip end surfaces thereof which abut with the bottom surfaces of the bosses. Consequently, when the dampers hit the bottom surfaces of the bosses, the dampers are easily elastically deformable for an increased dampening effect.

Inasmuch as the dampers have the respective through holes defined therein as axially extending holes which are open at the tip end surfaces of the dampers toward the bottom surfaces of the bosses, the dampers are more easily elastically deformable for an increased dampening effect.

The holes defined as the axially extending through holes in the dampers are effective to drain air or oil trapped in the bosses therethrough into the shift fork when the shift fork shaft is axially moved upon movement of one of the shift forks. Therefore, the shift fork shaft is free of the effect of such air or oil which would otherwise hinder movement of the shift fork shaft, and allows the gear transmission to make smooth gear shifts. If there is a through hole in dampers which are mounted in the both axial ends of the shift fork shaft, when one of the dampers hits the corresponding one of the bottom surfaces of the bosses, the axial through hole defined in the other damper is effective to drain air or oil in the shift fork shaft therethrough into the other one of the bosses, thereby preventing a pressure buildup in the shift fork shaft. The shift fork shaft is thus axially moved smoothly for the gear transmission to make smooth gear shifts.

The ends of the dampers which are opposite the tip end surfaces thereof that can abut with the bottom surfaces of the bosses are retained in place by fitting in the shift fork shaft and being held against the inner circumferential surface thereof. Therefore, the dampers can be installed and retained in the axial ends of the shift fork shaft with a simple structure.

The dampers are of a tubular shape and have the through holes extending axially therethrough in alignment with the central axis of the tubular shape. Therefore, when the dampers are fitted into the shift fork shaft, the dampers can easily be fitted into place by way of radially uniform compressive deformation, and can be securely held in place against undue dislodgement under uniform straining forces that the dampers exert once they are fitted in the shift fork shaft.

Each of the dampers includes the smaller-diameter portion fitted in the shift fork shaft and held against the inner circumferential surface thereof, and the larger-diameter portion having the tip end surface facing one of the bottom surfaces of the bosses. The larger-diameter portion has the integral positioner that is held in abutment against the end face of the shift fork shaft for controlling the position where the damper is fitted in the shift fork shaft. Therefore, each of the dampers provides the positioner as a unitary structure for keeping itself securely positioned with respect to the shift fork shaft without changing the shape of the shift fork shaft, so that there is no need to increase the number of parts making up the shift fork shaft assembly.

The axial length of the smaller-diameter portion is larger than the axial length of the larger-diameter portion. Therefore, the portion of the damper that is fitted in the axial end of the shift fork shaft is relatively long to safeguard against undue removal of the damper from the shift fork shaft.

MODE FOR CARRYING OUT THE INVENTION

Figure 1:
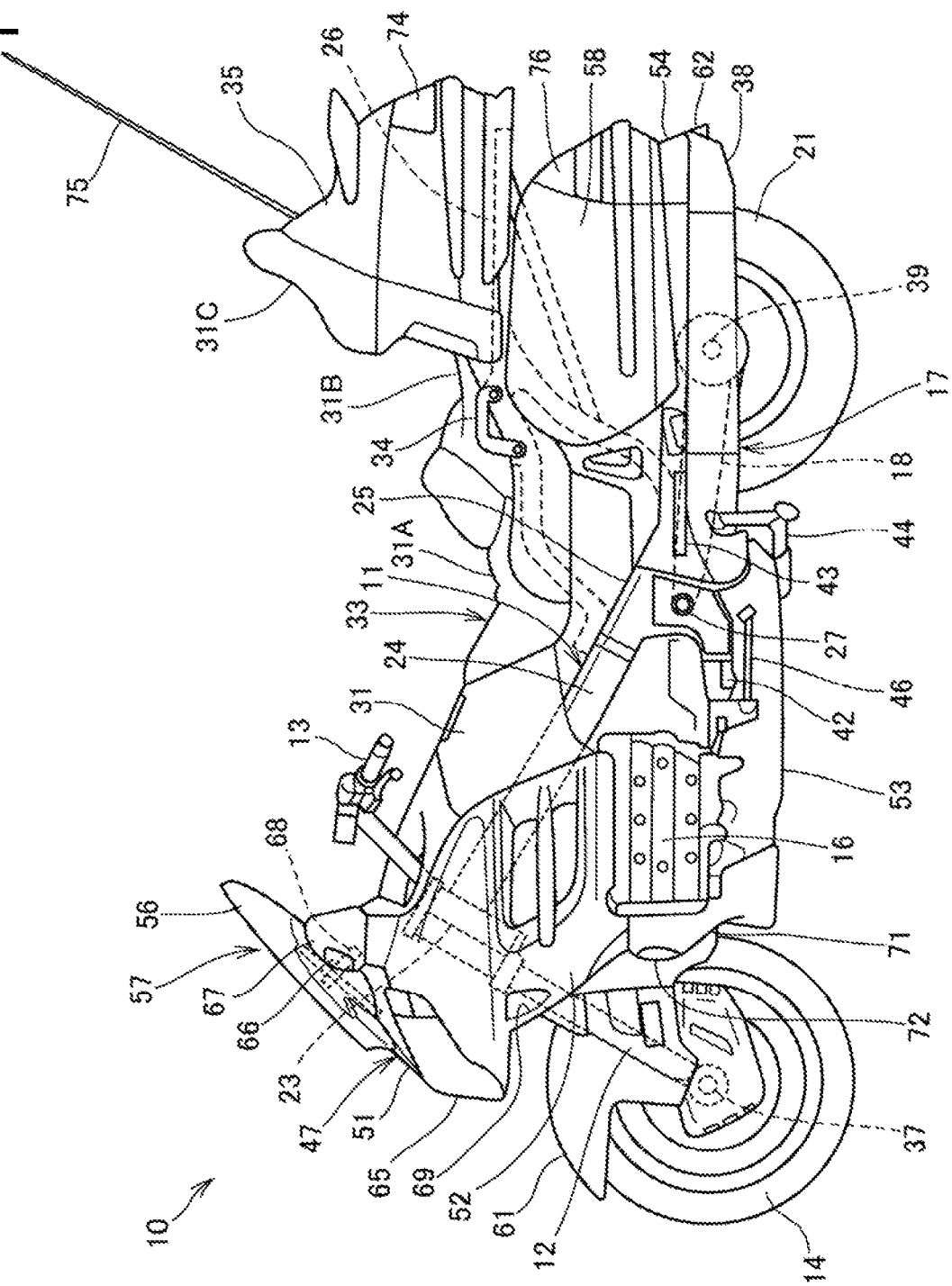
FIG. 1 is a left-hand side elevational view of a motorcycle which incorporates therein a vehicular gear transmission structure according to an embodiment of the present invention.

An embodiment according to the present invention will be described below with reference to the drawings. Directions such as forward, rearward, leftward, rightward, upward, and downward directions, for example, and other directional expressions referred to in the described below shall be in accord with those on a vehicle unless specified otherwise. In the drawings, the reference characters FR represent a forward direction of the vehicle, the reference characters UP an upward direction of the vehicle, and the reference characters LH a leftward direction of the vehicle.

FIG. 1 is a left-hand side elevational view depicting a motorcycle 10 which incorporates therein the vehicular gear transmission structure according to the embodiment of the present invention.

The motorcycle 10 is a vehicle including a vehicle frame 11, a front fork 12, a handle 13, a front wheel 14, a power unit 16, an exhaust device 17, a rear fork 18, and a rear wheel 21.

The vehicle frame 11 includes a head pipe 23, a pair of left and right main frames 24, a pair of left and right pivot plates 25, and a pair of left and right seat rails 26.

The head pipe 23 is disposed on a front end of the vehicle frame 11, and the front fork 12 is steerably supported on the head pipe 23. The main frames 24 extend obliquely rearwardly and downwardly on the left and right sides of the head pipe 23. The power unit 16 is supported on and beneath the main frames 24, and a fuel tank 31 is supported on and over the main frames 24. The pivot plates 25 are connected to rear portions of the main frames 24. The seat rails 26 extend obliquely rearwardly and upwardly from front and rear portions of the pivot plates 25. An occupant's seat 33 is supported on front portions of the seat rails 26, whereas grab rails 34 and a trunk box 35 are supported on rear portions of the seat rails 26.

The handle 13 is mounted on an upper end of the front fork 12, and the front wheel 14 is rotatably supported on a lower end of the front fork 12 by an axle 37 mounted thereon. The exhaust device 17 includes an exhaust pipe, not depicted, extending from the power unit 16 and a muffler 38 attached to a rear end of the exhaust pipe.

The rear fork 18 is vertically swingably supported on a pivot shaft 27 mounted on the pivot plates 25. The rear wheel 21 is rotatably supported on a rear end of the rear fork 18 by an axle 39 mounted thereon. A rear cushion unit, not depicted, is connected between the rear end of the rear fork 18 and the vehicle frame 11.

The occupant's seat 33, which is disposed behind the fuel tank 31, includes a rider's seat 31A where the rider is to be seated, a passenger's seat 31B where a passenger is to be seated, disposed behind and higher than the rider's seat 31A, and a passenger's seatback 31C erected from a rear end of the passenger's seat 31B. To the pivot plates 25 of the vehicle frame 11, there are attached a pair of left and right rider's steps 42 on which to place the rider's feet and a pair of left and right passenger's steps 43 on which to place the passenger's feet. A main stand 44, a side stand 46, and a vehicle cover 47 are attached to the vehicle frame 11.

The vehicle cover 47 includes a front cowl 51 covering a front portion of the vehicle, a pair of left and right side cowls 52 covering left and right sides of the vehicle, a lower cowl 53 covering a lower portion of the vehicle, and a rear cowl 54 covering a rear portion of the vehicle. A windshield device 57 for automatically vertically moving a windscreen 56 is mounted on the front cowl 51. The rear cowl 54 includes a pair of left and right integral side backs 58. The front wheel 14 has its upper portion covered with a front fender 61 mounted on the front fork 12, and the rear wheel 21 has its upper portion covered with a rear fender 62 mounted on the rear cowl 54.

The front cowl 51 supports a headlight 65 on its front surface, the windscreen 56 on its upper portion, and a pair of left and right mirrors 67 incorporating front winkers 66 on its left and right ends. A meter 68 is disposed in the front cowl 51.

The side cowls 52 have a pair of left and right air openings 69 defined therein for supplying ambient air from the front of the vehicle to areas around the power unit 16. A pair of left and right engine guards 71 are disposed in front of left and right portions of the power unit 16, and fog lamps 72 are attached individually to the engine guards 71.

The trunk box 35 supports a pair of left and right tail lamp units 74 on its rear surface and a rod antenna 75 on its right side which is used by an audio unit on the vehicle to receive radio broadcasts. Rear winkers 76 are disposed on rear surfaces of the side backs 58.

Figure 2:
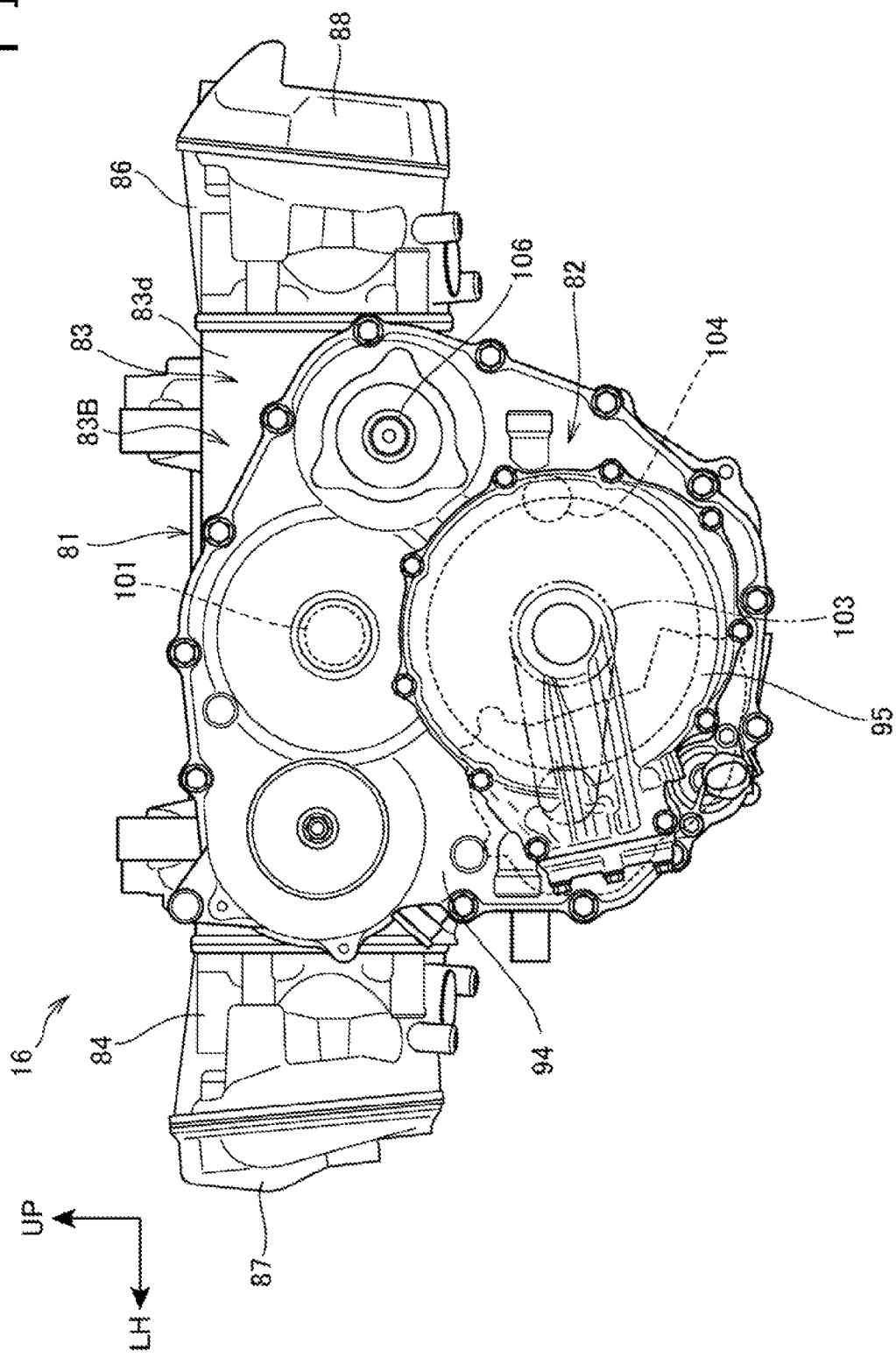
FIG. 2 is a rear elevational view of a power unit.
Figure 3:
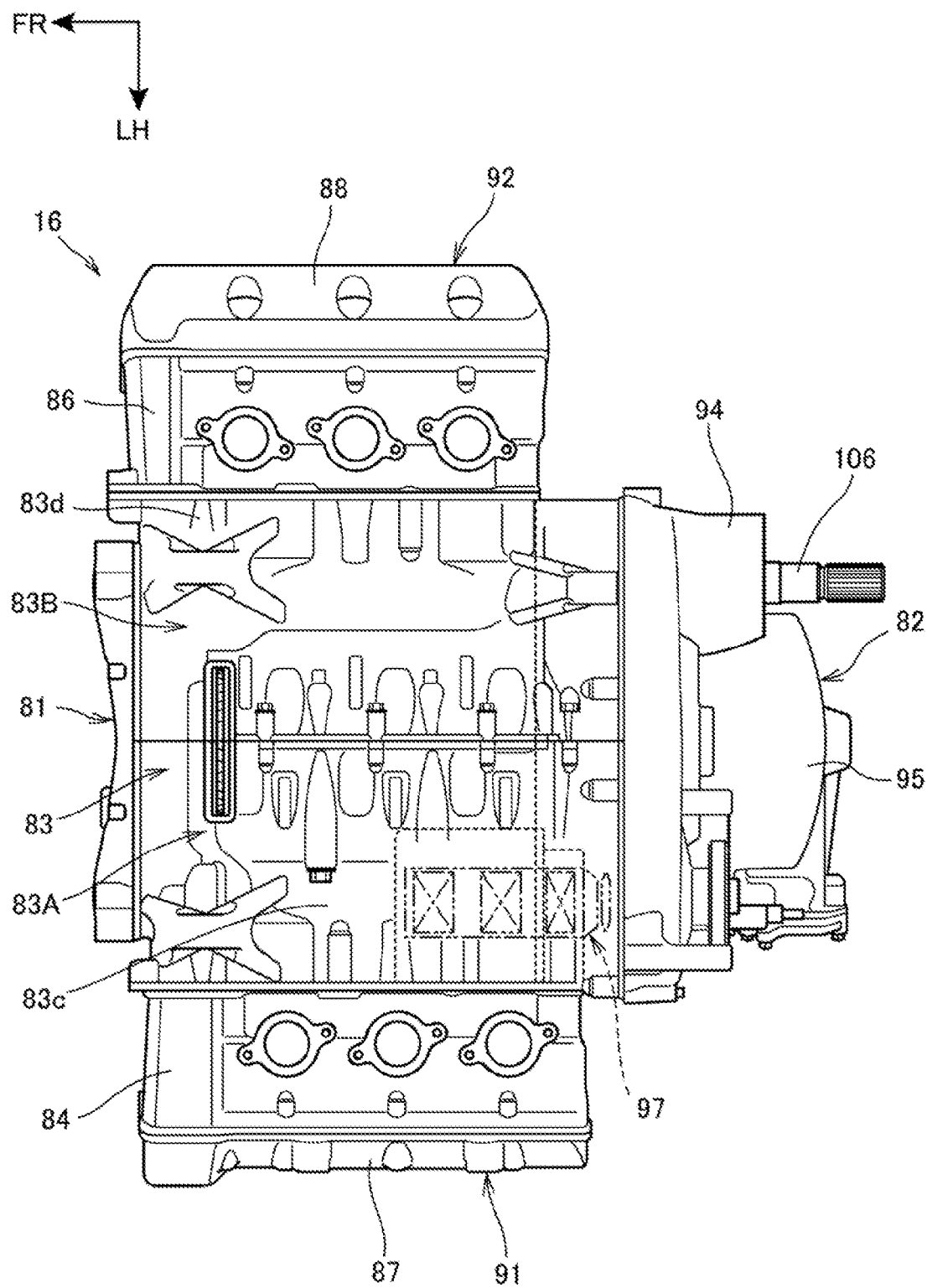
FIG. 3 is a plan view of the power unit.

FIG. 2 is a rear elevational view depicting the power unit 16. FIG. 3 is a plan view depicting the power unit 16.

As depicted in FIGS. 2 and 3, the power unit 16 includes an internal combustion engine 81 serving as its upper part and a gear transmission 82 integral with lower and rear portions of the internal combustion engine 81.

The internal combustion engine 81, which is a horizontally opposed cylinder engine, includes a crankcase 83 disposed centrally in the transverse directions of the vehicle, a left cylinder head 84 and a right cylinder head 86 which extend horizontally outwardly from the crankcase 83 in the transverse directions of the vehicle, and a left head cover 87 and a right head cover 88 which close off the bores of the left cylinder head 84 and the right cylinder head 86, respectively.

The crankcase 83 includes a left case 83A and a right case 83B which are horizontally separate from each other. A leftwardly projecting left end portion 83c of the left case 83A, the left cylinder head 84, and the left head cover 87 jointly make up a left cylinder assembly 91, whereas a rightwardly projecting right end portion 83d of the right case 83B, the right cylinder head 86, and the right head cover 88 jointly make up a right cylinder assembly 92.

A rear crankcase cover 94 is mounted on a rear end surface of the crankcase 83. A clutch cover 95 which bulges into a cup shape in a rearward direction of the vehicle is mounted on the center of a lower portion of the rear crankcase cover 94. The clutch cover 95 houses a clutch 112 (see FIG. 4) disposed therein. An oil pump unit 97 is disposed in the left case 83A.

The internal combustion engine 81 includes a crankshaft 101 housed in the crankcase 83 and extending in the longitudinal direction of the vehicle. The gear transmission 82 includes a main shaft 103 disposed below the crankshaft 101, a countershaft 104 disposed rightwardly of the main shaft 103, and an output shaft 106 disposed obliquely rightwardly and upwardly of the countershaft 104. The main shaft 103, the countershaft 104, and the output shaft 106 lie parallel to the crankshaft 101 individually.

The main shaft 103 and the countershaft 104 support thereon respective trains of transmission gears capable of transmitting power selectively at different gear ratios. The transmission gears can be shifted into different meshing combinations by gear shifting actions performed by the rider of the vehicle. The output shaft 106 projects from the rear crankcase cover 94 in the rearward direction of the vehicle. The output shaft 106 rotates about its own axis based on the power received from the countershaft 104, and transmits its rotational power through a power transmitting member such as a driveshaft or the like to the rear wheel 21 (see FIG. 1).

Figure 4:
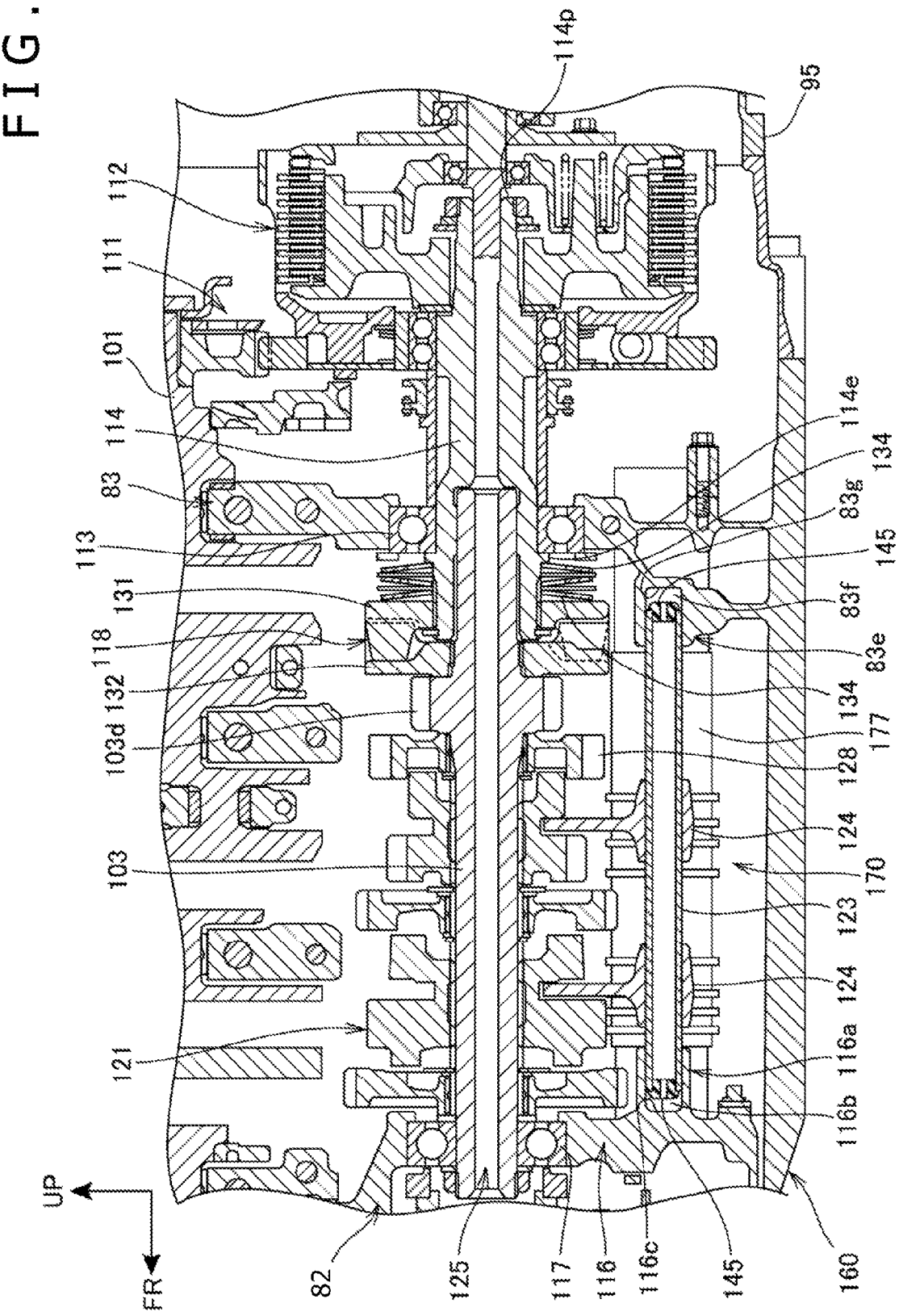
FIG. 4 is a fragmentary cross-sectional view of the power unit.

FIG. 4 is a fragmentary cross-sectional view of the power unit 16.

The gear transmission 82 includes a speed reducer mechanism 111, a clutch 112, a clutch shaft 114, the main shaft 103, a transmission holder 116, a cam damper 118, a main shaft gear train 121, a shift fork shaft 123, a plurality of shift forks 124, and a shift drum 177.

The clutch 112 is supplied at its input side with the power from the crankshaft 101 through the speed reducer mechanism 111. The clutch shaft 114 has an end connected to the output side of the clutch 112 and an intermediate portion rotatably supported by a bearing 113 mounted on the crankcase 83. The main shaft 103 has an end relatively rotatably supported by the other end of the clutch shaft 114 and the other end supported by a bearing 117 on the transmission holder 116 provided in a transmission case 160. The clutch shaft 114 and the main shaft 103 jointly make up a transmission shaft 125.

The cam damper 118 is provided between the clutch shaft 114 and the main shaft 103. When an excessive torque or a torque variation in excess of a predetermined torque is applied from the clutch shaft 114 to the main shaft 103, the cam damper 118 rotates relatively to the main shaft 103, dampening the excessive torque or the torque variation that is transmitted. The main shaft gear train 121 includes a plurality of transmission gears mounted on the main shaft 103.

The shift fork shaft 123 includes a hollow shaft whose both ends are supported individually by a shaft support 83e of the transmission case 160 and a shaft support 116a of the transmission holder 116. The shift forks 124 are axially movably supported on the shift fork shaft 123. In response to a certain gear shifting action by the rider of the vehicle, the shift drum 177 is angularly moved about its own axis to cause one of the transmission gears of the main shaft gear train 121 to move axially on the main shaft 103 into mesh with a corresponding one of the transmission gears of the countershaft gear train, thereby bringing the gear transmission into a desired gear position.

The shift fork shaft 123 and the shift forks 124 make up part of a gear shifting mechanism 170 for selecting and shifting transmission gears to change gear positions in response to a manual gear shifting action by the rider of the vehicle.

Figure 5:
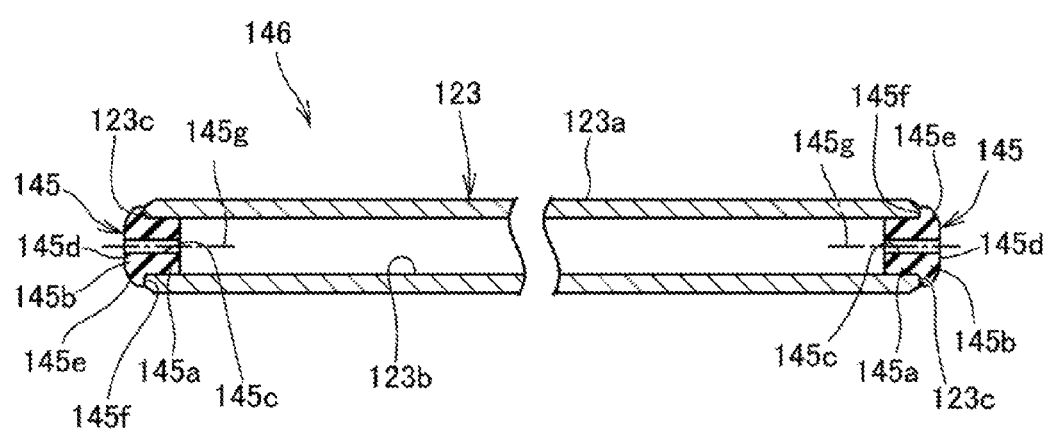
FIG. 5 is a cross-sectional view of a shift fork shaft assembly of the vehicular gear transmission structure.

FIG. 5 is a cross sectional view depicting a shift fork shaft assembly 146.

The shift fork shaft 123 includes a straight tubular component, and the shift forks 124 (see FIG. 4) are movably fitted over an outer circumferential surface 123a of the shift fork shaft 123. Two caps 145 of rubber are fitted in both ends of the shift fork shaft 123. The shift fork shaft 123 and the pair of caps 145 jointly make up the shift fork shaft assembly 146.

Each of the caps 145 includes a cylindrical neck 145a press-fitted in the open end of the shift fork shaft 123 and held against an inner circumferential surface 123b thereof, and a head 145b of substantially trapezoidal cross section which is integrally formed with an end of the neck 145a. The cap 145 has a central axis 145g extending axially therethrough.

The neck 145a and the head 145b have a through hole 145c defined axially therethrough which provides fluid communication between the outside and inside of the shift fork shaft 123 when the cap 145 is fitted in the shift fork shaft 123. The through hole 145c is axially aligned with the central axis 145g of the cap 145.

The head 145b has a tapered portion 145e that is progressively smaller in diameter toward a tip end surface 145d of the head 145b and an abutment surface 145f held in abutment against an end face 123c of the shift fork shaft 123.

As depicted in FIG. 4, since the caps 145 fitted in the respective end portions of the shift fork shaft 123 are elastic members, the shift fork shaft 123 produces no hammering noise even when one of the caps 145 hits the bottom surface 83g of a shaft support hole 83f, defined in the shaft support 83e of the transmission case 160, or the other cap 145 hits the bottom surface 116c of a shaft support hole 116b, defined in the shaft support 116a of the transmission holder 116, at the time the shift fork shaft 123 is axially moved in the shaft support holes 83f and 116b upon movement of one of the shift forks 124.

When one of the caps 145 hits the bottom surface 83g of the shaft support hole 83f (or the other cap 145 hits the bottom surface 116c of the shaft support hole 116b), air or oil trapped in the shaft support hole 83f (or the shaft support hole 116b) is drained through the through hole 145c defined in the hitting cap 145 into the hollow shift fork shaft 123. At the same time, air or oil in the hollow shift fork shaft 123 is drained through the through hole 145c defined in the cap 145 opposite the hitting cap 145 into the shaft support hole 116b (or the shaft support hole 83f). Therefore, the caps 145 are allowed to flex smoothly, and the shift fork shaft 123 is easily and smoothly moved axially together with the shift forks 124, so that the gear transmission can make smooth gear shifts.

In FIG. 4, the shaft support 83e of the transmission case 160 is integrally connected to a bearing support that supports the bearing 113 and is disposed radially outwardly of the cam damper 118. Since the shaft support 116a also supports the main shaft 103, the shaft support 83e that is connected to the shaft support 116a is of high rigidity. Consequently, even when the shift fork shaft assembly 146 is moved toward the bottom surface 83g of the shaft support hole 83f in response to a gear shifting action by the rider of the vehicle, the movement of the shift fork shaft assembly 146 is not obstructed, but the shift fork shaft 123 is smoothly moved. The gear shifting mechanism 170 is thus capable of shifting gears smoothly.

As depicted in FIGS. 4 and 6, the vehicular gear transmission structure includes the gear transmission 82 including the transmission shaft 125, the transmission gears axially movably mounted on the transmission shaft 125, and the gear shifting mechanism 170 having the shift drum 177 angularly movable in response to a gear shifting action, the shift fork shaft 123 supported by the transmission case 160 of the gear transmission 82, and the shift forks 124 axially movably supported on the shift fork shaft 123, whereby when the shift drum 177 is angularly moved about its own axis in response to a gear shifting action, a selected one of the shift forks 124 and a corresponding one of the transmission gears are axially moved to change gear positions. The shift fork shaft 123 has both end portions movably fitted individually in the shaft supports 83e and 116a serving as bosses of the gear transmission 82, with clearances left between the bottom surfaces 83g and 116c of the shaft supports 83e and 116a and both end faces 123c of the shift fork shaft 123, and caps 145 are mounted in both axial ends of the shift fork shaft 123.

With the above arrangement, since the caps 145 are mounted in the axial ends of the shift fork shaft 123, it is possible to prevent hammering noise from being produced due to direct collision between the end faces 123c of the shift fork shaft 123 and the bottom surfaces 83g and 116c of the shaft supports 83e and 116a. When the shift forks 124 are moved, they can be moved separately from the shift fork shaft 123. Therefore, though the shift forks 124 themselves impose resistance at the time a gear shifting action is performed, no sliding resistance occurs between the shift fork shaft 123 and the shaft supports 83e and 116a, allowing the gear transmission 82 to shift gears smoothly.

The caps 145 include elastic members and are of a trapezoidal cross-sectional shape tapered off toward the tip end surfaces 145d thereof which will hit the bottom surfaces 83g and 116c of the shaft supports 83e and 116a. Consequently, when the caps 145 hit the bottom surfaces 83g and 116c of the shaft supports 83e and 116a, the caps 145 are easily elastically deformable for an increased dampening effect.

Inasmuch as the caps 145 have the respective through holes 145c defined therein as axially extending holes which are open at the tip end surfaces 145d thereof toward the bottom surfaces 83g and 116c of the shaft supports 83e and 116a, the caps 145 are more easily elastically deformable for an increased dampening effect.

The holes defined as the axially extending through holes 145c in the caps 145 fitted in the axial end portions of the shift fork shaft 123 are effective to drain air or oil trapped in the shaft supports 83e and 116a therethrough into the shift fork 124 when the shift fork shaft 123 is axially moved upon movement of one of the shift forks 124. Therefore, the shift fork shaft 123 is free of the effect of such air or oil which would otherwise hinder movement of the shift fork shaft 123, and allows the gear transmission to make smooth gear shifts. There is the axial through hole 145c in the caps 145 which are mounted in the both axial ends of the shift fork shaft 123. Thus, when one of the caps 145 hits the corresponding one of the bottom surfaces 83g and 116c of the shaft supports 83e and 116a, the axial through hole 145c defined in the other cap 145 is effective to drain air or oil in the shift fork shaft 123 therethrough into the other one of the shaft supports 83e and 116a, thereby preventing a pressure buildup in the shift fork shaft 123. The shift fork shaft 123 is thus axially moved smoothly for the gear transmission to make smooth gear shifts.

The ends of the caps 145 which are opposite the tip end surfaces 145d thereof that can abut with the bottom surfaces 83g and 116c of the shaft supports 83e and 116a are retained in place by fitting in the shift fork shaft 123 and being held against the inner circumferential surface 123b thereof. Therefore, the caps 145 can be installed and retained in the axial ends of the shift fork shaft 123 with a simple structure.

The caps 145 are of a tubular shape and have the through holes 145c extending axially therethrough in alignment with the central axis 145g of the tubular shape. Therefore, when the caps 145 are fitted into the shift fork shaft 123, the caps 145 can easily be fitted into place by way of radially uniform compressive deformation, and can be securely held in place against undue dislodgement under uniform straining forces that the caps 145 exert once they are fitted in the shift fork shaft 123.

Each of the caps 145 includes the neck 145a as a smaller-diameter portion fitted in the open end of the shift fork shaft 123 and held against the inner circumferential surface thereof, and the head 145b as a larger-diameter portion having the tip end surface 145d facing one of the bottom surfaces 83g and 116c of the shaft supports 83e and 116a. The head 145b has the integral abutment surface 145f that is held in abutment against the end face 123c of the shift fork shaft 123 and serves as a positioner for controlling the position where the cap 145 is fitted in the shift fork shaft 123. Therefore, each of the caps 145 provides the abutment surface 145f as a unitary structure for keeping itself securely positioned with respect to the shift fork shaft 123 without changing the shape of the shift fork shaft 123, so that there is no need to increase the number of parts making up the shift fork shaft assembly.

The axial length of the neck 145a is larger than the axial length of the head 145b. Therefore, the neck 145a, i.e., the portion of the cap 145 that is fitted in the axial end of the shift fork shaft 123, is relatively long to safeguard against undue removal of the cap 145 from the shift fork shaft 123.

The embodiment which has been described above represents one aspect of the invention by way of illustrative example only, and various changes and modifications can be made therein without departing from the scope of the invention.

For example, rather than the caps 145 of rubber mounted in the both axial ends of the shift fork shaft 123 as depicted in FIG. 5, there may be employed cylindrical rubber members or compressive coil springs as elastic members between the end faces 123c of the shift fork shaft 123 and the bottom surfaces 83g and 116c of the shaft supports 83e and 116a. Alternatively, cylindrical rubber members or compressive coil springs as elastic members may be fixed to the bottom surfaces 83g and 116c of the shaft supports 83e and 116a for bearing the shift fork shaft 123 when it is axially moved. At any mode, the present invention is capable of preventing hammering noise from being produced by collision between the shift fork shaft 123 and the shaft supports 83e and 116a while the shift fork shaft 123 is freely movable between the shaft supports 83e and 116a, and for allowing the gear transmission to make smooth gear shifts.

The present invention is not limited to being applied to the motorcycle 10, but is also applicable to vehicles other than the motorcycle 10.

DESCRIPTION OF REFERENCE SYMBOLS

10 Motorcycle (vehicle)
82 Gear transmission
83e, 116a Shaft support (boss)
83g, 116c Bottom surface
123 Shift fork shaft
123c End face
124 Shift fork
125 Transmission shaft
145 Cap (damper)
145a Neck (smaller-diameter portion)
145b Head (larger-diameter portion)
145c Through hole (hole)
145d Tip end surface
145f Abutment surface (positioner)
145g Central axis
160 Transmission case
170 Gear shifting mechanism
177 Shift drum

The invention claimed is:

1. A vehicular gear transmission structure comprising a gear transmission (82) including a transmission shaft (125), a plurality of transmission gears axially movably mounted on said transmission shaft (125), and a gear shifting mechanism (170) having a shift drum (177) angularly movable in response to a gear shifting action, a shift fork shaft (123) supported by a transmission case (160) of said gear transmission (82), and a plurality of shift forks (124) axially movably supported on said shift fork shaft (123), whereby when said shift drum (177) is angularly moved about its own axis in response to a gear shifting action, a selected one of said shift forks (124) and a corresponding one of said transmission gears are axially moved to change gear positions, wherein said shift fork shaft (123) has both end portions movably fitted in bosses (83e, 116a) of said gear transmission (82), with clearances left between bottom surfaces (83g, 116c) of said bosses (83e, 116a) and both end faces (123c, 123c) of said shift fork shaft (123), and dampers (145) are mounted in both axial ends of said shift fork shaft (123).

2. The vehicular gear transmission structure according to claim 1, wherein said dampers (145) include elastic members and are of a trapezoidal cross-sectional shape tapered off toward tip end surfaces (145d) thereof which abut with the bottom surfaces (83g, 116c) of said bosses (83e, 116a).

3. The vehicular gear transmission structure according to claim 2, wherein said dampers (145) have axially extending holes (145c) defined therein which are open at tip end surfaces (145d) thereof toward the bottom surfaces (83g, 116c) of said bosses (83e, 116a).

4. The vehicular gear transmission structure according to claim 3, wherein said axially extending holes (145c) include through holes (145c) extending axially through said dampers (145).

5. The vehicular gear transmission structure according to claim 1, wherein said dampers (145) have axially extending holes (145c) defined therein which are open at tip end surfaces (145d) thereof toward the bottom surfaces (83g, 116c) of said bosses (83e, 116a).

6. The vehicular gear transmission structure according to claim 5, wherein said axially extending holes (145c) include through holes (145c) extending axially through said dampers (145).

7. The vehicular gear transmission structure according to claim 1, wherein said dampers (145) have respective ends, which are opposite tip end surfaces (145d) thereof which abut with the bottom surfaces (83g, 116c) of said bosses (83e, 116a), retained in place by fitting in said shift fork shaft (123) and held against an inner circumferential surface thereof.

8. The vehicular gear transmission structure according to claim 1, wherein said dampers (145) are of a tubular shape and have said holes (145c) defined therein which extend therethrough in alignment with a central axis (145g) of the tubular shape.

9. The vehicular gear transmission structure according to claim 1, wherein each of said dampers (145) includes a smaller-diameter portion (145a) fitted in said shift fork shaft (123) and held against an inner circumferential surface thereof, and a larger-diameter portion (145b) having a tip end surface (145d) facing one of the bottom surfaces (83g, 116c) of said bosses (83e, 116a), said larger-diameter portion (145b) having an integral positioner (145f) that is held in abutment against an end face (123c) of said shift fork shaft (123) for controlling the position where the damper (145) is fitted in said shift fork shaft (123).

10. The vehicular gear transmission structure according to claim 9, wherein an axial length of said smaller-diameter portion (145a) is larger than an axial length of said larger-diameter portion (145b).

* * * * *